United States Patent
Mene et al.

(10) Patent No.: US 12,288,466 B2
(45) Date of Patent: Apr. 29, 2025

(54) COLLABORATIVE RULESET MANAGEMENT FOR VEHICLES

(71) Applicant: INTERNATIONAL BUSINESS MACHINES CORPORATION, Armonk, NY (US)

(72) Inventors: Atul Mene, Morrisville, NC (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 18/056,899

(22) Filed: Nov. 18, 2022

(65) Prior Publication Data
US 2024/0169833 A1 May 23, 2024

(51) Int. Cl.
*G08G 1/0967* (2006.01)
*B60W 50/14* (2020.01)
*B60W 60/00* (2020.01)

(52) U.S. Cl.
CPC ....... *G08G 1/096725* (2013.01); *B60W 50/14* (2013.01); *B60W 60/001* (2020.02); *G08G 1/096775* (2013.01); *B60W 2050/146* (2013.01); *B60W 2556/45* (2020.02)

(58) Field of Classification Search
CPC ...... G08G 1/096725; G08G 1/096775; B60W 50/14; B60W 60/001; B60W 2050/146; B60W 2556/45
See application file for complete search history.

(56) References Cited

U.S. PATENT DOCUMENTS

| | | |
|---|---|---|
| 8,520,695 B1 | 8/2013 | Rubin |
| 9,001,153 B2 | 4/2015 | Green |
| 9,151,634 B2 | 10/2015 | Ann |
| 9,632,507 B1 | 4/2017 | Korn |
| 9,817,404 B1 | 11/2017 | Loo |
| 9,944,317 B2 | 4/2018 | Lee |
| 10,089,876 B1 * | 10/2018 | Ramasamy ............ G05D 1/028 |

(Continued)

FOREIGN PATENT DOCUMENTS

CN 106167045 B 2/2020

OTHER PUBLICATIONS

Dube, "Automotive Industry Architecture":, IBM's POV—IBM Cloud Architecture, Accessed Aug. 19, 2022, 9 pgs, <https://www.IBM.com/cloud/architecture/architectures/automotive/>.

(Continued)

*Primary Examiner* — Behrang Badii
(74) *Attorney, Agent, or Firm* — James Olsen

(57) ABSTRACT

Aspects of the present disclosure relate to collaborative rulesets for vehicles. A collaborative ruleset for a set of vehicles can be received, the collaborative ruleset defining relative positions each vehicle is required to maintain with respect to other vehicles within the set of vehicles. Sensor data indicating current positions of each vehicle within the set of vehicles while the set of vehicles are operating can be received. A command to display, on an augmented reality (AR) device of a user of a first vehicle within the set of vehicles, AR content for complying with the collaborative ruleset can be issued.

18 Claims, 5 Drawing Sheets

(56) References Cited

U.S. PATENT DOCUMENTS

| | | | |
|---|---|---|---|
| 10,332,322 | B2 | 6/2019 | Nix |
| 10,992,755 | B1 * | 4/2021 | Tran ........................ G01S 13/88 |
| 11,073,840 | B2 | 7/2021 | Park |
| 11,299,154 | B2 | 4/2022 | Kim |
| 11,360,485 | B2 | 6/2022 | Schuh |
| 11,361,670 | B2 * | 6/2022 | Robinson ................ G06F 3/011 |
| 2019/0179341 | A1 | 6/2019 | Switkes |
| 2020/0233435 | A1 | 7/2020 | Kichkaylo |
| 2020/0247412 | A1 * | 8/2020 | Wang ...................... G02B 27/01 |
| 2021/0009159 | A1 | 1/2021 | Stock |
| 2023/0319140 | A1 * | 10/2023 | Tran ................. B60W 60/0015 709/203 |

OTHER PUBLICATIONS

Herperger, Driving in Canada for Visitors/Rules, Tips, & Info (2022), Jul. 19, 2022, 22 pgs, <https://travellemming.com/driving-in-canada/#Traffic-Lights>.

IBM, "Automotive 2025—How Consumers, Mobility, and Blurred Boundaries Disrupt the Industry", 7 pgs, Accessed Aug. 18, 2022, <https://www.ibm.com/thought-leadership/institute-business-value/report/auto2025>.

IBM, "Disruptive Automotive Technology Solutions", Accessed Aug. 19, 2022, 9 pgs, <https://www.ibm.com/industries/automotive>.

IBM, "IoT Solutions", Accessed Aug. 19, 2022, 9 pgs, <https://www.ibm.com/cloud/internet-of-things>.

IBM, "What's Next in AI is Fluid Intelligence", Access Aug. 19, 2022,9 pgs, <https://research.ibm.com/artificial-Intelligence>.

No Author, "Flashing Green Lights and What They Mean", Access Aug. 19, 2022, 36 pgs, <https://www.tranbc.ca/2014/10/03/flashing-green-lights-and-what-they-mean/#>.

No Author, "The Official Ministry of Transportation (MTO) Driver's Handbook" , Accessed Aug. 19, 2022, 6 pgs, <https://www.ontario.ca/document/official-mto-drivers-handbook/traffic-lights#>.

Storr., "How Augmented Reality is Moving From Gaming to the Office", Think Blog, Jul. 26, 2018, 6 pgs, <https://www.ibm.com/blogs/think/2018/07/see-see-app/>.

* cited by examiner

COLLABORATIVE RULESET MANAGEMENT FOR VEHICLES

BACKGROUND

The present disclosure relates generally to the field of computing, and in particular, to collaborative rulesets for vehicles.

Semi-autonomous and autonomous vehicles (i.e., self-driving cars) are vehicles that include autonomation components sufficient for sensing their own environment and taking actions with limited human input. A variety of sensors can be incorporated into semi-autonomous or autonomous vehicles to receive environmental information in a vicinity of the vehicle. Advanced control systems can analyze the sensor data received from the integrated sensors to control functions of the vehicle, such as the navigation path or following distance.

In certain scenarios, vehicles travel together within a group during an event (e.g., a parade) or to reach a particular destination (e.g., a funeral procession). In these scenarios, each vehicle ideally travels uniformly with respect to other vehicles within the group. That is, each vehicle should be positioned in particular positions with respect to other vehicles within the group. However, there is currently no manner for defining and enforcing rules for maintaining positional uniformity among vehicles within groups.

SUMMARY

Aspects of the present disclosure relate to a computer program product, system, and method for collaborative rulesets for vehicles. A collaborative ruleset for a set of vehicles can be received, the collaborative ruleset defining relative positions each vehicle is required to maintain with respect to other vehicles within the set of vehicles. Sensor data indicating current positions of each vehicle within the set of vehicles while the set of vehicles are operating can be received. A command to display, on an augmented reality (AR) device of a user of a first vehicle within the set of vehicles, AR content for complying with the collaborative ruleset can be issued.

The above computer program product, system, and method for collaborative ruleset management for vehicles provide various improvements. By defining and applying a collaborative ruleset to a set of vehicles, positional uniformity between each vehicle of the set of vehicles can be maintained. Further, AR content which depicts actions required (e.g., by the user or an advanced control system of an autonomous vehicle) for following the collaborative ruleset can be displayed on an AR device worn by a user. This can allow users to view required actions to follow the collaborative ruleset without distracting the users while they are operating their vehicles.

Aspects of the present disclosure further relate to a computer program product, system, and method where the AR content for complying with the collaborative ruleset includes visual guidance displayed on the AR device over the user's field of view which guides the first user to take actions within the first vehicle to comply with the collaborative ruleset.

The above computer program product, system, and method for collaborative ruleset management for vehicles provide improvements by depicting actions required by the user for following the collaborative ruleset. This can allow the users to view required actions to follow the collaborative ruleset without distracting the users while they are operating their vehicles.

Aspects of the present disclosure further relate to a computer program product, system, and method where the first vehicle is an autonomous or semi-autonomous vehicle, where the AR content includes a projected path the first vehicle will take to follow the collaborative ruleset. The above computer program product, system, and method for collaborative ruleset management for vehicles provide improvements by depicting actions taken by the autonomous or semi-autonomous vehicle for following the collaborative ruleset. This can allow users to view projected actions the autonomous or semi-autonomous vehicle will take to follow the collaborative ruleset.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
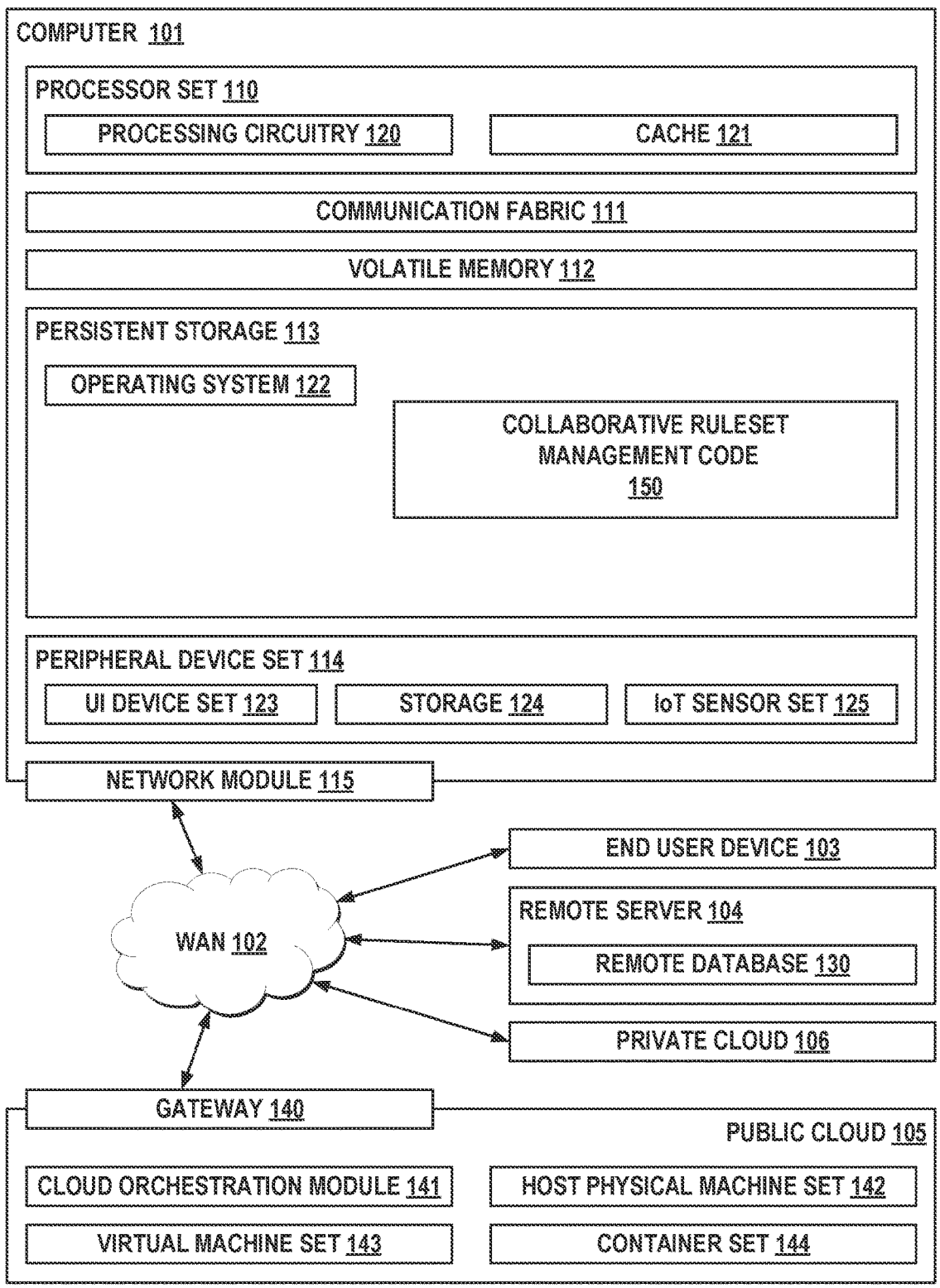
FIG. 1 is a high-level block diagram illustrating an example computer system and network environment that can be used in implementing one or more of the methods, tools, modules, and any related functions described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to collaborative rulesets for vehicles. While the present disclosure is not necessarily limited to such applications, various aspects of the disclosure may be appreciated through a discussion of various examples using this context.

Augmented reality devices are wearable computer-capable devices that generate virtual objects, such as three-dimensional images, text, animations, and videos, to overlay onto the wearer's field of vision to enable the wearer to view and interact with the virtual objects. Augmented reality merges the real world and the virtual world to create an immersive experience. AR devices can track position and orientation of a user such that alignment between virtual objects rendered on an AR display and the real world can be attained.

Semi-autonomous and autonomous vehicles (i.e., self-driving cars) are vehicles that include autonomation components sufficient for sensing their own environment and taking actions with limited human input. A variety of sensors can be incorporated into semi-autonomous or autonomous vehicles to receive environmental information in a vicinity of the vehicle. Advanced control systems can analyze the sensor data received from the integrated sensors to control functions of the vehicle, such as the navigation path or following distance.

In certain scenarios, vehicles travel together within a group during an event (e.g., a parade) or to reach a particular destination (e.g., a funeral procession). In these scenarios, each vehicle ideally travels uniformly with respect to other vehicles within the group. That is, each vehicle should be positioned in particular positions with respect to other vehicles within the group. However, there is currently no manner for defining and enforcing rules for maintaining positional uniformity among vehicles within groups. There is a need to define collaborative rulesets for vehicles to enable positional uniformity between vehicles within a vehicle set. There is further a need to update the collaborative rulesets based on current contextual conditions (e.g., current driving conditions or hazards). Further still, there is a need to provide a method for guiding compliance with the defined collaborative rulesets.

Aspects of the present disclosure relate to collaborative ruleset management for vehicles. A collaborative ruleset for a set of vehicles can be received, the collaborative ruleset defining relative positions each vehicle is required to maintain with respect to other vehicles within the set of vehicles. Sensor data indicating current positions of each vehicle within the set of vehicles while the vehicles are currently operating can be received. A command to display, on an augmented reality (AR) device of a user of a first vehicle within the set of vehicles, AR content for complying with the collaborative ruleset can be issued.

Aspects of the present disclosure provide various improvements. By defining and applying a collaborative ruleset to a set of vehicles, positional uniformity (e.g., positional relationships) between each vehicle of the set of vehicles can be maintained. Further, AR content which depicts actions required (e.g., by the user or an advanced control system of an autonomous vehicle) for following the collaborative ruleset can be displayed on an AR device worn by a user. This can allow the users to view required actions to follow the collaborative ruleset without distracting the users while they are operating their vehicles.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a high-level block diagram illustrating an example computing environment 100 that can be used in implementing one or more of the methods, tools, modules, and any related functions described herein, in accordance with embodiments of the present disclosure. Computing environment 100 contains an example of an environment for the execution of at least some of the computer code involved in performing the inventive methods, such as collaborative ruleset management code 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and collaborative ruleset management code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in collaborative ruleset management code 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in collaborative ruleset management code 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
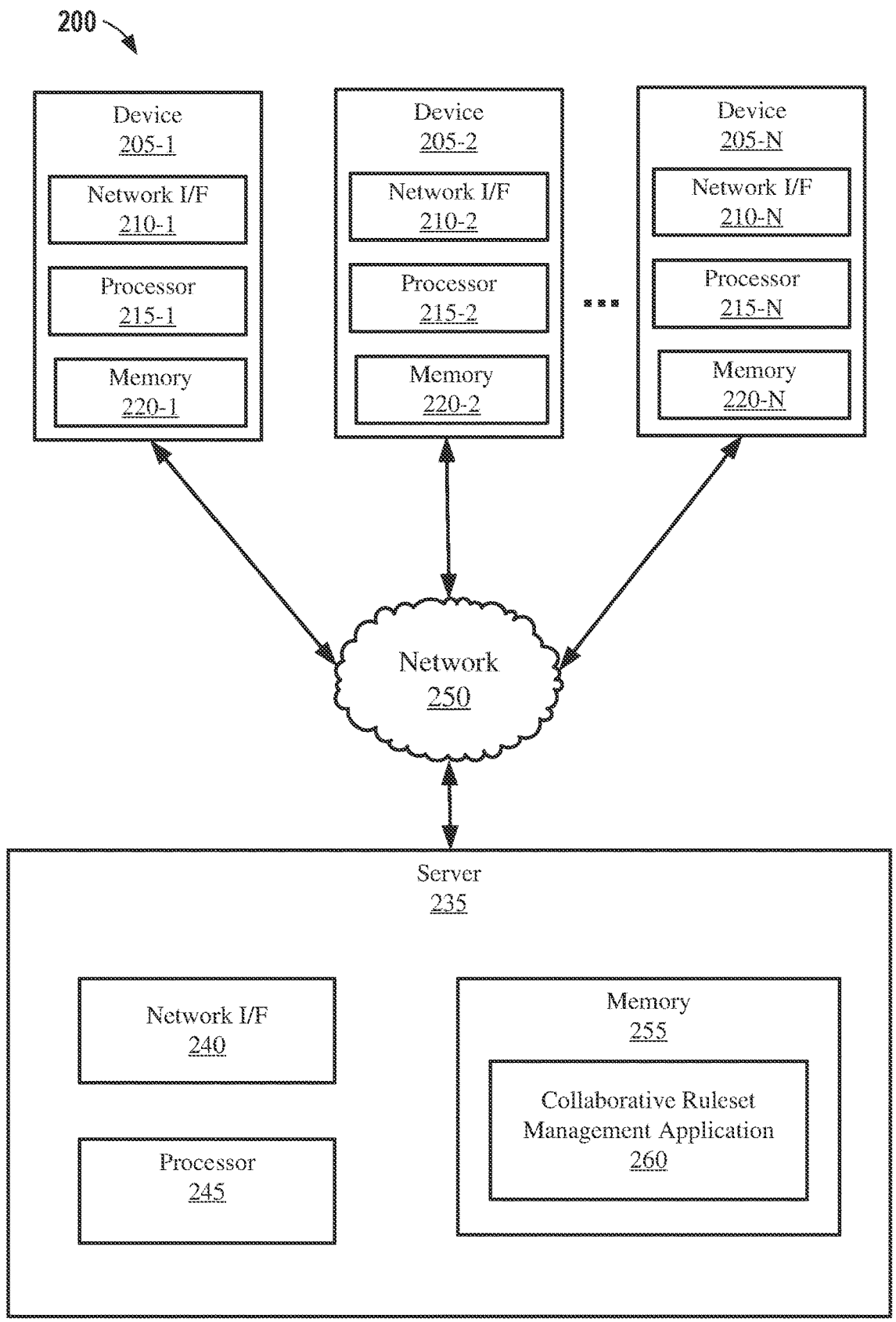
FIG. 2 is block diagram illustrating an example network environment, in accordance with embodiments of the present disclosure.

FIG. 2 is a block diagram illustrating an example computing environment 200 in which illustrative embodiments of the present disclosure can be implemented. Computing environment 200 includes a plurality of devices 205-1, 205-2 . . . 205-N (collectively devices 205), at least one server 235, and a network 250.

The devices 205 and the server 235 include one or more processors 215-1, 215-2, . . . , 215-N (collectively processors 215) and 245 and one or more memories 220-1, 220-2, . . . , 220-N (collectively memories 220) and 255, respectively. The processors 215 and 245 can be same as, or substantially similar to, processor set 110 of FIG. 1. The memories 220 and 255 can be the same as, or substantially similar to volatile memory 112 and/or persistent storage 113 of FIG. 1.

The devices 205 and the server 235 can be configured to communicate with each other through internal or external network interfaces 210-1, 210-2 . . . 210-N (collectively network interfaces 210) and 240. The network interfaces 210 and 240 are, in some embodiments, modems or network interface cards. The network interfaces 210 and 240 can be the same as, or substantially similar to, network module 115 described with respect to FIG. 1.

The devices 205 and/or the server 235 can be equipped with a display or monitor. Additionally, the devices 205 and/or the server 235 can include optional input devices (e.g., a keyboard, mouse, scanner, a biometric scanner, video camera, or other input device), and/or any commercially available or custom software (e.g., self-driving software, web conference software, browser software, communications software, server software, natural language processing software, search engine and/or web crawling software, image processing software, augmented reality/virtual reality (AR/VR) software, etc.). For example, devices 205 and/or server 235 can include components/devices such as those described with respect to peripheral device set 114 of FIG. 1. The devices 205 and/or the server 235 can be servers, desktops, laptops, or hand-held devices. The devices 205 can be autonomous or semi-autonomous vehicles having one or more processing circuits. The devices 205 and/or the server 235 can be the same as, or substantially similar to, computer 101, remote server 104, and/or end user device 103 described with respect to FIG. 1.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. In embodiments, the network 250 can be the same as, or substantially similar to, WAN 102 described with respect to FIG. 1. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In embodiments, network 250 can be coupled with public cloud 105 and/or private cloud 106 described with respect to FIG. 1.

The server 235 includes a collaborative ruleset management application (CRMA) 260. The CRMA 260 can be configured to obtain (e.g., define, receive, request, or otherwise obtain) a collaborative ruleset dictating positional requirements for a plurality of vehicles (i.e., a set of vehicles) with respect to each other and/or the environment. In embodiments, the CRMA 260 can be configured to update the collaborative ruleset based on contextual conditions (e.g., predetermined triggers such as weather conditions, location changes, nearby hazards, etc.). In embodiments where a human operator opts into the CRMA 260, the CRMA 260 can be configured to display guidance for following the collaborative ruleset (e.g., via an augmented reality (AR) interface) to a user. In embodiments where autonomous or semi-autonomous vehicles are instructed to follow the collaborative ruleset, the CRMA 260 can be configured to display (e.g., via an AR interface) the projected path/actions the autonomous or semi-autonomous vehicle will be navigating to follow the collaborative ruleset to a user.

The CRMA 260 can first be configured to obtain a collaborative ruleset for a plurality of vehicles. A "collaborative ruleset" is a set of rules which dictates positional requirements of vehicles within a vehicle set with respect to each other and/or the environment. In embodiments, the collaborative ruleset can dictate positional requirements such as horizontal spacing between vehicles (e.g., one lane, 5 meters, 10 meters, etc.), vertical spacing (i.e., following distance) between vehicles (e.g., two car lengths, 10 meters, 20 meters, etc.), and vehicular arrangement (e.g., vehicle 1 leads, vehicle 2 follows vehicle 1, vehicle 3 follows vehicle 2, etc.). In embodiments, the collaborative ruleset can dictate positional requirements of vehicles with respect to the environment. For example, the collaborative ruleset can dictate particular lanes to position vehicles within, navigation paths to take, distance from the shoulder of the road, etc.

The collaborative ruleset can be defined in any suitable manner. In embodiments, the collaborative ruleset is defined based on manual input received from one or more users. In embodiments, the collaborative ruleset can be automatically defined using one or more pre-defined rules (e.g., a template) and/or machine learning (ML)/artificial intelligence (AI) techniques. The collaborative ruleset can be defined by the CRMA 260 or requested/received from another source.

The CRMA 260 can be configured to monitor compliance with the collaborative ruleset while a set of vehicles which the collaborative ruleset applies to are operating. That is, the CRMA 260 can be configured to monitor sensor data (e.g., received from the vehicles or surrounding internet of things (IoT) sensors) to determine whether each vehicle of the set of vehicles is following the collaborative ruleset or whether there are any deviations from the collaborative ruleset (e.g., beyond a threshold). Thus, the CRMA 260 can be configured to monitor a set of vehicles bound by the collaborative ruleset to ensure each vehicle within the set is following the collaborative ruleset during operation (e.g., while navigating from a starting point to a destination).

In embodiments, the CRMA 260 can be configured to dynamically update the collaborative ruleset (e.g., alter horizontal spacing requirements, vertical spacing requirements, and/or vehicular arrangement) based on observed contextual conditions. For example, the CRMA 260 can be configured to alter the collaborative ruleset based on driving conditions (e.g., snow, rain, fog, sleet, etc.), location (e.g., the set of vehicles enters a new geofence with different rules), or hazards (e.g., a nearby accident or road impediment). The collaborative ruleset can be updated to increase or decrease spacing requirements between vehicles and/or alter arrangement of vehicles. As an example, if snowy weather is detected, the collaborative ruleset can be updated to increase vertical spacing (e.g., lengthwise spacing or following distance) between vehicles of the vehicle set. As another example, if weather conditions change from rainy and slippery roads to sunny and dry roads, the collaborative ruleset can be updated to decrease vertical spacing requirements between vehicles of the vehicle set.

Conditions for updating the collaborative ruleset can be determined manually or automatically. For example, in embodiments, users can manually indicate conditions requiring alteration of the collaborative ruleset. In embodiments, IoT sensors (e.g., of vehicles and/or surrounding IoT sensors) can be configured to determine contextual conditions which require alteration of the collaborative ruleset. In embodiments, conditions for updating the collaborative ruleset can be determined based on data received from an external source (e.g., a weather application, mapping and navigation software, etc.).

In embodiments, vehicles within the vehicle set can include autonomous or semi-autonomous functionality. In these embodiments, the CRMA 260 can instruct the vehicles to follow the collaborative ruleset within self-driving instructions. Thus, the autonomous or semi-autonomous functionality of the vehicles can enable the vehicles to automatically follow the collaborative ruleset. In these embodiments, the vehicles can continually receive control signals such that they are compliant with the collaborative ruleset. That is, sensor data collected from one or more sensors of the autonomous or semi-autonomous vehicles can be analyzed such that control signals can be issued (e.g., by an advanced control system (ACS)) to position the vehicles within particular positions as dictated by the collaborative ruleset.

In embodiments with autonomous or semi-autonomous vehicles, the CRMA 260 can be configured to display guidance data to users regarding actions to be taken by the autonomous or semi-autonomous vehicles to comply with the collaborative ruleset. For example, the CRMA 260 can be configured to display, on an AR interface worn by a user, guidance data indicating a projected path their autonomous or semi-autonomous vehicle will be taking to follow the collaborative ruleset. However, the guidance data can be displayed/presented in any other suitable manner. For example, guidance data can be displayed on a mobile device (e.g., smart phone), a navigation device (e.g., a touchscreen integrated in a vehicle), or any other suitable display. In embodiments, the guidance data can be presented in the form of audio data (e.g., projected paths/actions can be emitted from one or more speakers in the user's environment).

In embodiments, vehicles within the vehicle set can include manual vehicles which require user input to maintain control. In these embodiments, the CRMA 260 can be configured to generate guidance data to guide users regarding actions to take to comply with the collaborative ruleset. For example, the CRMA 260 can be configured to display, on an AR device worn by a user, guidance data indicating a projected path and/or action the user should take to comply with the collaborative ruleset. As an example, if a user of a vehicle does not satisfy a following distance threshold set in a collaborative ruleset, AR-based guidance can be displayed to the user such that they take actions to satisfy the following distance threshold (e.g., feedback indicating that the user should increase or decrease their speed). In embodiments, guidance can be presented to users in response to determining that a rule within the collaborative ruleset is broken (e.g., the vehicle is non-compliant with the collaborative ruleset). The guidance data can be presented in any suitable manner, as discussed above.

In some embodiments, artificial intelligence/machine learning (AI/ML) algorithms can be used to define collaborative rulesets, to determine contextual conditions for updating the collaborative ruleset, to determine specific updates to make to the collaborative ruleset based on observed conditions, and to generate guidance data for following the collaborative ruleset. AI/ML algorithms that can be used to define collaborative rulesets, determine contextual conditions for updating the collaborative ruleset, determine specific updates to make to the collaborative ruleset based on observed conditions, and for generating guidance data for following the collaborative ruleset include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to CRMA 260, CRMS 305 (discussed below), and/or datastore 380 (discussed below) can be analyzed or utilized as training data using any of the aforementioned machine learning algorithms.

More specifically, the AI/ML algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other techniques.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN 102, a LAN, a wired connection, an intranet, or the Internet).

Though this disclosure pertains to the collection of personal data (e.g., contextual data, vehicle sensor data, etc.), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

Figure 3:
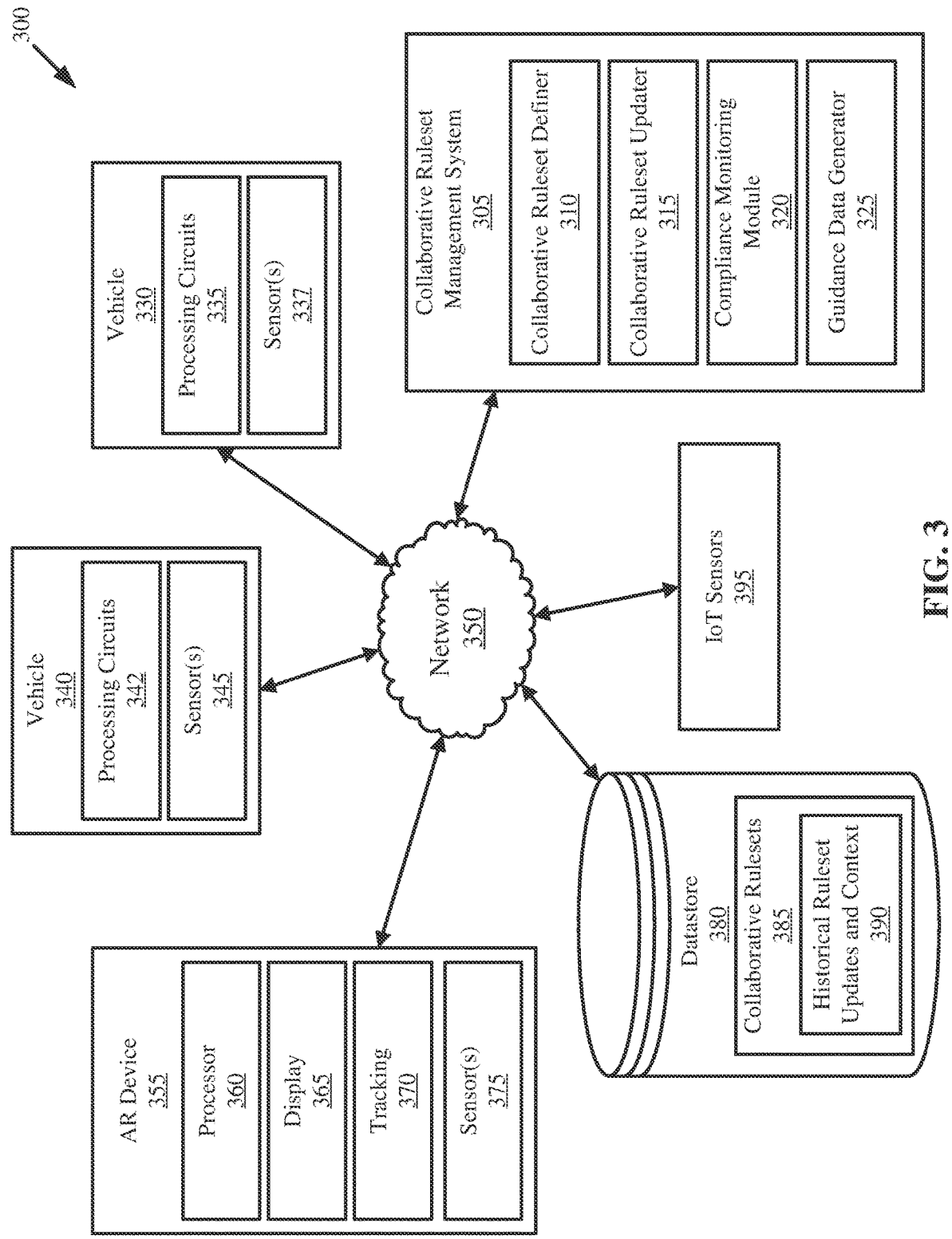
FIG. 3 is a block diagram illustrating an example network environment including a collaborative ruleset management system, in accordance with embodiments of the present disclosure.

Referring now to FIG. 3, shown is a block diagram illustrating an example network environment 300 in which illustrative embodiments of the present disclosure can be implemented. The network environment 300 includes a collaborative ruleset management system (CRMS) 305, vehicles 330 and 340, an AR device 355, a datastore 380, and IoT sensors 395, each of which can be communicatively coupled for intercomponent interaction via a network 350. In embodiments, the network 350 can be the same as, or substantially similar to, network 250 and/or WAN 102. In embodiments, the vehicles 330 and 340, AR device 355, IoT sensors 395, and CRMS 305 can be the same as, or substantially similar to, computer 101, devices 205, and/or server 235.

The AR device 355 includes a processor 360, a display 365 (e.g., a screen for displaying digital content), tracking 370 (e.g., position, orientation, and gaze tracking), and sensors 375 (e.g., a front facing camera for computer vision). In embodiments, tracking 370 can include receiving a gazed image (e.g., detected by eye tracking cameras) on which tracked eyes are fixed and determining coordinates of an axis of a line-of-sight, also referred to as a sightline or visual axis, the user is viewing within the field of vision captured by the tracking 370. This can aid in updating locations of guidance data to be displayed on the display 365 of the AR device 355. AR device 355 can be a wearable computer-capable device that generates digital information, such as three-dimensional images, text, animations, and videos, to overlay into the wearer's field of vision so the digital information is viewable along with real world scenes in the wearer's field of vision.

The AR device 355 may include components found in smartphones, tablet computers, and other modern computer technology. AR rendering may be performed by optical projection systems, monitors, handheld devices, graphical processing units, and/or display systems worn on the human body. A head-mounted display (HMD) is a display device worn on the forehead, such as a harness or a helmet which can support AR device interface to a human body. In embodiments, tracking 370 can be configured to perform six degrees of freedom monitoring that allows the AR device 355 to align virtual information to the physical world and adjust accordingly with the AR user's head movements. The AR device 355 may also implement gesture controls for enhanced immersion.

In embodiments, AR device 355 may be implemented as eyeglasses and employ cameras to capture real world views such that AR imagery can be displayed on the display 365 in particular locations. In embodiments, the AR device 355 can include a head-up display (HUD), which can be a transparent display that presents data without requiring users to look away from their usual viewpoints. AR device 355 can alternatively or additionally be implemented as contact lenses and/or virtual retinal displays, where a display is superimposed directly over the retina of a viewer's eye. For example, EyeTap augmented reality devices can capture rays of light that would otherwise pass through the center of the lens of the wearer's eye, and can substitute synthetic computer-controlled light for each ray of light. Sensors 375 of AR device 355 can include, among others potential sensors, digital cameras and/or other optical sensors, accelerometers, a global positioning system (GPS), gyroscopes, solid state compasses, and radio-frequency identification (RFID).

In embodiments, the AR device 355 or a user device (not shown) can enable the user to interface (e.g., control, manage, view, etc.) the CRMS 305. For example, an application (e.g., CRMA 260) which allows the user to change configuration settings of functionalities of the CRMS 305 can be installed on the AR device 355 or a personal device. This can allow the user to define collaborative rulesets, set conditions for updating collaborative rulesets, set collaborative ruleset alterations based on conditions, and set guidance data preferences (e.g., AR guidance, audio guidance, etc.), among other configurable settings.

Vehicles 330 and 340 can comprise manual, semi-autonomous, or fully autonomous vehicles. Vehicles 330 and 340 can be a sedan, sport-utility-vehicle (SUV), truck, bus, all-terrain vehicle (ATV), aerial vehicle (e.g., plane, helicopter, quadcopter, etc.), train, ship (e.g., ferry, cruise liner, etc.), or a different form of vehicular transport.

Vehicles 330 and 340 can have autonomous capabilities. For example, vehicles 330 and 340 can include self-driving instructions which dictate various traffic rules that the vehicles 330 and 340 must follow while traveling. For example, self-driving instructions can include lane rules (e.g., specifying the correct side of the road, specifying that the car should remain in the center of a lane, etc.), light/signage rules (e.g., stop light rules, construction zone rules, school zone rules, yield, stop sign rules, etc.), acceleration/speed rules, situational rules (e.g., stopping during a school bus drop off, no right turns around a city bus), rules (e.g., yielding priority with multiple cars at an intersection), etc. In embodiments, the self-driving instructions depend on the applicable traffic rules in the jurisdiction where the vehicles 330 and 340 are operating. For example, traffic rules in the United States differ from traffic rules in the United Kingdom (e.g., right vs. left handed traffic).

To follow the traffic rules set forth in the self-driving instructions, the vehicles 330 and 340 include sensors 337 and 345, respectively. The sensors 337 and 345 can continuously collect sensor data while the vehicles 330 and 340 are operating, and the sensor data can be used to control the vehicles 330 and 340 (e.g., using proportional-integral-derivative (PID) control) by one or more processing circuits 335 and 342 of the vehicles 330 and 340, respectively. The sensors 337 and 345 can include, but are not limited to, radar, computer vision, lidar, sonar, global positioning system (GPS), odometry, and inertial measurement units (IMUs). For example, computer vision may be used to recognize signage, brake lights, buses, traffic lines, etc., lidar can be used for object detection and avoidance, and GPS can be used for routing. Generally, processing circuits 335 and 342 of vehicles 330 and 340 respond to the data collected by the sensors 337 and 345 to comply with the self-driving instructions.

The CRMS 305 includes a collaborative ruleset definer 310, a collaborative ruleset updater 315, a compliance monitoring module 320, and a guidance data generator 325. The functionalities of the collaborative ruleset definer 310, collaborative ruleset updater 315, compliance monitoring module 320, and guidance data generator 325 can be processor-executable instructions that can be executed by a dedicated or shared processor using received inputs.

The collaborative ruleset definer 310 can be configured to define, receive, request, or otherwise obtain a collaborative ruleset for a set of vehicles (e.g., which can include vehicles 330 and 340). As discussed above, a collaborative ruleset defines positional requirements of vehicles within a vehicle set with respect to each other or the environment. The collaborative ruleset can define positional requirements such as horizontal spacing (e.g., widthwise spacing between vehicles, such as lane spacing designations and/or horizontal distance requirements between vehicles), vertical spacing (e.g., lengthwise spacing between vehicles, such as following distance requirements between vehicles), and/or vehicular arrangement (e.g., which vehicles are positions in front, back, left, or right). In embodiments where vehicles 330 and 340 are air-based vehicles, the collaborative ruleset can define height-based spacing between vehicles in addition to horizontal and/or vertical spacing requirements. In embodiments where vehicles 330 and 340 are submergible marine-based vehicles, the collaborative ruleset can define depth-based spacing between vehicles in addition to horizontal and/or vertical spacing requirements. In embodiments, the collaborative ruleset can dictate positional requirements of vehicles with respect to the environment (e.g., the road). For example, the collaborative ruleset can dictate particular lanes to position vehicles within, navigation paths to take, distance from the shoulder of the road, and other potential environmental based position requirements.

The collaborative ruleset obtained by the collaborative ruleset definer 310 can be defined in any suitable manner. In embodiments, the collaborative ruleset is defined based on manual input received from one or more users. For example, a user can indicate, on a graphical user interface (GUI), positional requirements such as horizontal spacing requirements, vertical spacing requirements, and vehicular arrangement requirements. In embodiments, the collaborative ruleset can be automatically defined using one or more pre-defined rules (e.g., a template). For example, pre-defined rules can automatically define positional requirements of vehicles based on the number of vehicles, type of vehicles (e.g., sedan versus truck), and/or based on the route taken (e.g., the number of available lanes in the route, the length of the route, etc.).

Datastore 380 can include historically defined collaborative rulesets 385 and associated historical ruleset updates and context 390. In embodiments, previous collaborative rulesets 385 can be used to determine future collaborative rulesets based on a current vehicle set using insights gathered from historical collaborative rulesets 385. For example, if a new collaborative ruleset is to be generated for a set of vehicles, the historical collaborative rulesets 385 can be analyzed to determine a ruleset that was applied for a similar set of vehicles (e.g., a similar number and type of vehicles) and in a similar context (e.g., location, route, and driving conditions). Thus, aspects of the present disclosure recognize that a collaborative ruleset for a set of vehicles can be defined based on insights ascertained from historical collaborative ruleset 385 data.

In embodiments, an AI/ML algorithm can be trained to automatically define collaborative rulesets using the number of vehicles, type of vehicles, and/or route taken as input data. In these embodiments, the AI/ML algorithm can be trained via supervised or unsupervised learning. For example, in supervised learning, the AI/ML algorithm can be fed pre-defined collaborative rulesets for a particular vehicle set (e.g., labeled data), where the vehicle set includes a number of vehicles, characteristics for vehicles (e.g., the make and model), and a route taken by the vehicle set. Thereafter, upon training, the AI/ML algorithm can be configured to automatically generate collaborative rulesets upon receiving data indicating characteristics of a vehicle set (e.g., the number and type of vehicles) and route taken by the vehicle set. In embodiments with unsupervised learning, such as a neural network, the collaborative ruleset can be automatically defined without requiring user labeling. That is, the trained unsupervised learning AI/ML algorithm can be configured to receive input data (the characteristics of the vehicle set and the route taken by the vehicle set) and automatically output a determined collaborative ruleset based on the input data. Any of the AI/ML algorithms discussed with respect to FIG. 2 can be configured to determine the collaborative ruleset based on received input data. In embodiments, historical collaborative ruleset 385 data of datastore 380 can be used as input data for generating collaborative rulesets using AI/ML techniques.

In embodiments, the collaborative ruleset can be defined by the CRMS 305 or requested/received from another source. For example, in some embodiments, the collaborative ruleset can be obtained from an external application or device.

The collaborative ruleset updater 315 can be configured to update the collaborative ruleset obtained by the collaborative ruleset definer 310. The collaborative ruleset updater 315 can update the collaborative ruleset based on observed contextual conditions. For example, the collaborative ruleset updater 315 can be configured to update the collaborative ruleset based on weather/road conditions (e.g., detected fog, snow, rain, sleet, environmental light levels, etc.), location (e.g., the set of vehicles enters a new geofence with different rules), and/or hazards (e.g., nearby accidents or road impediments). In embodiments, the collaborative ruleset updater 315 can be configured to update the collaborative ruleset based on manual indications received from a user. For example, a user can manually indicate one or more rule changes they desire to make to the collaborative ruleset (e.g., the user can manually change spacing requirements and/or vehicular arrangement requirements set forth in the collaborative ruleset).

The collaborative ruleset updater 315 can update the collaborative ruleset in any suitable manner. In embodiments, the collaborative ruleset updater 315 can be configured to alter spacing requirements (e.g., vertical and horizontal spacing requirements) or vehicular arrangement based on determined contextual conditions. As such, aspects of the present disclosure recognize that the collaborative ruleset can be updated to alter (e.g., increase or decrease) spacing requirements and/or vehicular arrangement requirements defined within the collaborative ruleset based on observed contextual conditions. As an example, if a particular weather condition is determined, the collaborative ruleset updater 315 can be configured to increase spacing requirements (e.g., increase vertical and/or horizontal spacing requirements) between vehicles. As another example, if a particular geolocation is determined, the collaborative ruleset updater 315 can be configured to alter vehicular arrangement requirements within the vehicle set. However, the collaborative ruleset updater 315 can be configured to update the collaborative ruleset in any suitable manner based on any suitable observed contextual condition. In embodiments, the magnitude of the update to the collaborative ruleset (e.g., the amount spacing requirements are altered) can depend on the specific determined contextual condition. For example, snowy weather may lead to a larger spacing requirement increase within the collaborative ruleset than rainy weather.

In embodiments, the contextual conditions for updating the collaborative ruleset can be determined by sensors 337, 345 of vehicles 330, 340, sensors 375 of AR device 355, or IoT sensors 395. Contextual conditions such as visibility conditions, weather conditions, hazards, and/or location updates can be determined based on sensor data received by one or more sensors within the network environment 300. For example, computer vision sensors can be configured to obtain data corresponding to visibility conditions, temperature sensors can be configured to obtain data corresponding to road conditions (e.g., whether roads are icy), GPS sensors can be configured to obtain data corresponding to location updates, LIDAR or other optical sensors can be configured to obtain data corresponding to weather conditions, etc. Any suitable type of sensor can be configured to obtain data related to contextual conditions that can be used for updating the collaborative ruleset. In embodiments, contextual conditions can be manually indicated by a user. For example, a user can select an input option or otherwise designate a contextual condition to be considered by the collaborative ruleset updater 315.

In embodiments, data received from external sources, such as weather applications and mapping/navigation software, can be used to determine contextual conditions. For example, weather, road, and/or visibility conditions can be determined as obtained from a weather application. As another example, current nearby hazards (e.g., accidents) can be determined as obtained from mapping/navigation software.

In embodiments, historical ruleset updates and context 390 data stored within datastore 380 can be used to update collaborative rulesets by the collaborative ruleset updater 315. For example, if a particular contextual condition is determined, the historical ruleset updates and context 390 data can be referenced to determine a historical collaborative ruleset update that was made under similar contextual conditions. As such, aspects of the present disclosure recognize that historical collaborative ruleset updates and corresponding contexts can be used to update the collaborative ruleset based on current observed context.

In embodiments, an AI/ML algorithm can be trained to automatically update collaborative rulesets using the historical ruleset updates and context 390 data as input data. In these embodiments, the AI/ML algorithm can be trained via supervised or unsupervised learning. For example, in supervised learning, the AI/ML algorithm can be fed historical ruleset update and context 390 data indicating previous collaborative ruleset updates, vehicle set characteristics (e.g., number and type of vehicles) affected by previous collaborative ruleset updates, and conditions/manners in which collaborative ruleset updates were made (e.g., based on particular contextual conditions or manually by a user). Thereafter, upon training, the AI/ML algorithm can be configured to automatically update collaborative rulesets upon receiving current data indicating characteristics of a vehicle set and contextual conditions. In embodiments with unsupervised learning, such as a neural network, the collaborative ruleset can be automatically defined without requiring user labeling. That is, the trained unsupervised learning AI/ML algorithm can be configured to receive historical ruleset updates and context 390 data and automatically update the collaborative ruleset based on the input data. Any of the AI/ML algorithms discussed with respect to FIG. 2 can be configured to update the collaborative ruleset based on received input data.

The collaborative ruleset updater 315 can update the collaborative ruleset throughout operation of the vehicle set. That is, the collaborative ruleset can be updated during any time throughout the navigation process by the vehicle set. In embodiments, determining whether to update the collaborative ruleset based on contextual data can be completed continuously, intermittently, periodically, or over any other suitable time interval during operation of the vehicle set.

The compliance monitoring module 320 can be configured to obtain sensor data indicating current positions of each vehicle within the vehicle set while they are operating to determine whether each vehicle is complying with the collaborative ruleset. The compliance monitoring module 320 can analyze sensor data to ensure all spacing requirements and vehicular arrangement requirements are satisfied within the vehicle set. Any sensor data discussed with respect to FIG. 3 can be used to determine whether each vehicle is complying with the collaborative ruleset. For example, sensor data from sensors 337 and 345 of vehicles 330 and 340, sensor data received from sensors 375 of AR device 355, and/or sensor data received from IoT sensors 395 (e.g., traffic cameras, sensors of nearby vehicles which are not a part of the vehicle set, etc.) can be utilized to determine whether compliance with the collaborative ruleset is maintained. In embodiments, if a vehicle of the vehicle set deviates from a rule within the collaborative ruleset (e.g., by a threshold amount), then a determination can be made the vehicle is non-compliant with the collaborative ruleset. The guidance data generator 325 can then be configured to generate guidance data such that the vehicle can comply with the collaborative ruleset.

In embodiments, as discussed above, vehicles within the vehicle set can include autonomous or semi-autonomous functionality. In these embodiments, the CRMS 305 can instruct the vehicles to follow the collaborative ruleset within self-driving instructions. Thus, the autonomous or semi-autonomous functionality of the vehicles can enable the vehicles to automatically follow the collaborative ruleset. In these embodiments, the vehicles can continually receive control signals such that they are compliant with the collaborative ruleset. That is, sensor data collected from one or more sensors of the autonomous or semi-autonomous vehicles can be analyzed such that control signals can be issued to position the vehicles within a particular positions as dictated by the collaborative ruleset.

In embodiments with autonomous or semi-autonomous vehicles, the guidance data generator 325 can be configured to display guidance data to users regarding actions to be taken by the autonomous or semi-autonomous vehicles to comply with the collaborative ruleset. For example, the guidance data generator 325 can be configured to display, on the AR device 355, guidance data (in the form of AR content) indicating a projected path their autonomous or semi-autonomous vehicle will be taking to follow the collaborative ruleset. This can occur at any time period throughout operation by the vehicle.

In embodiments, vehicles within the vehicle set can include manual vehicles which require user input to maintain control. In these embodiments, the guidance data generator 325 can be configured to generate guidance data to guide users regarding actions to take to comply with the collaborative ruleset. For example, the guidance data generator 325 can be configured to display, on the AR device 355, guidance data (in the form of AR content) indicating a projected path and/or action the user should take to comply with the collaborative ruleset. As an example, if a user of a vehicle does not satisfy a following distance threshold set in a collaborative ruleset, AR-based guidance can be displayed to the user such that they satisfy the following distance threshold (e.g., feedback indicating that the user should increase or decrease their speed). In embodiments, guidance data can be presented to users in response to determining that a rule within the collaborative ruleset is not satisfied (e.g., the vehicle is non-compliant with the collaborative ruleset).

Guidance data can be displayed/presented in any suitable manner. For example, guidance data can be displayed on a mobile device (e.g., smart phone), a navigation device (e.g., a touchscreen integrated in the vehicle), AR device 355, or any other suitable display. In embodiments, the guidance data can be presented in the form of audio data (e.g., projected paths/actions can be emitted from one or more speakers in the user's environment).

The guidance data can include any suitable virtual objects to convey guidance for following the collaborative ruleset. For example, in visual guidance examples, one or more lines or arrows can be displayed on AR device 355 guiding the user towards a particular position. As another example, textual data (e.g., "brake," "slow down," "accelerate," "speed up," "move leftwards," "move rightwards," etc.) can be displayed indicating an action that should be taken by the user to comply with the collaborative ruleset. In embodiments, one or more symbols, colors (e.g., red can indicate slow down or brake, green can indicate speed up or accelerate), or avatars can be displayed to guide/inform users.

Figure 4:
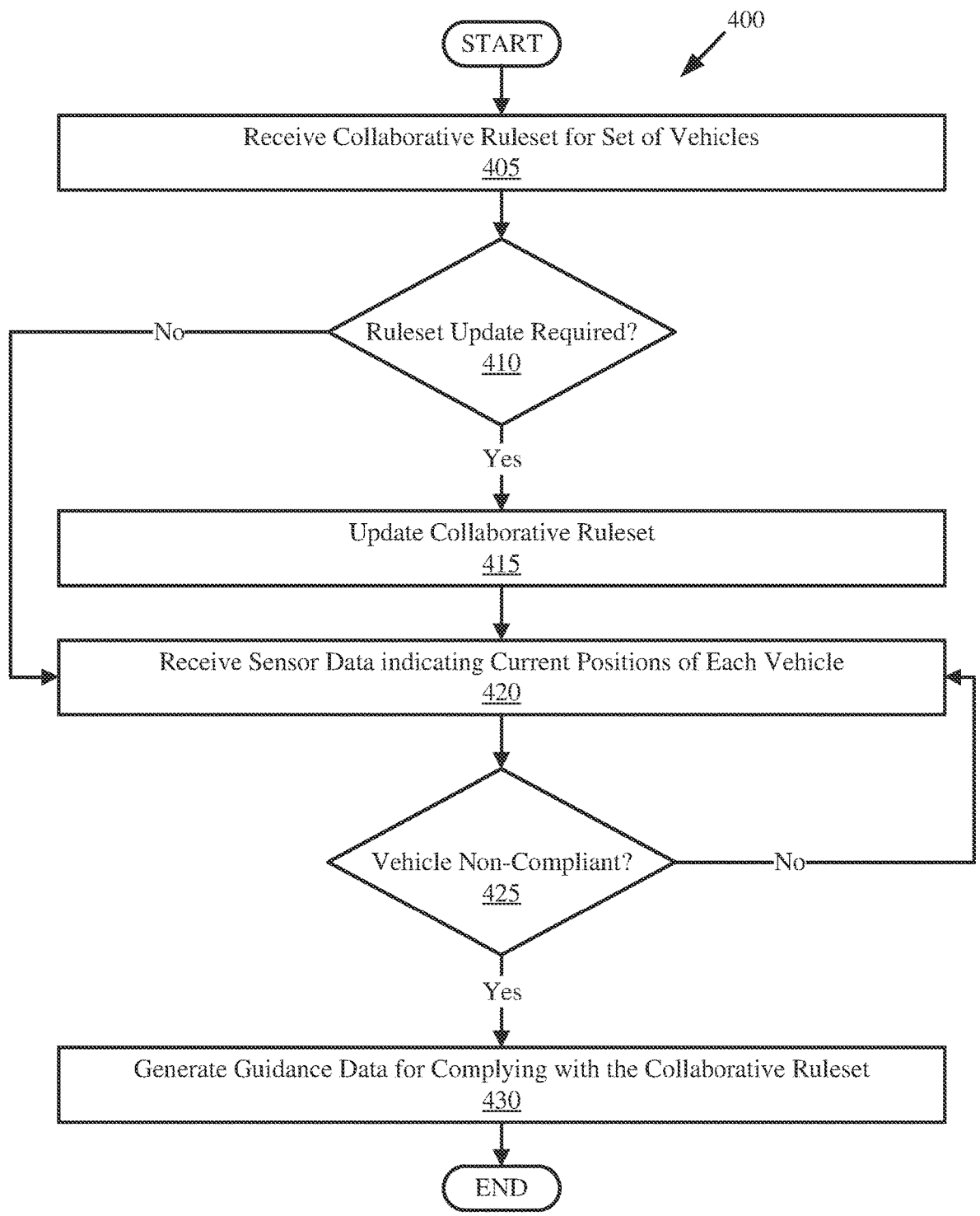
FIG. 4 is a flow-diagram illustrating an example method for collaborative ruleset management, in accordance with embodiments of the present disclosure.

Referring now to FIG. 4, shown is a flow-diagram of an example method 400 for collaborative ruleset management, in accordance with embodiments of the present disclosure. One or more operations of method 400 can be completed by one or more processing circuits (e.g., computer 101, devices 205, server 235, vehicles 330 and 340, AR device 355, CRMS 305, IoT sensors 395).

Figure 5:
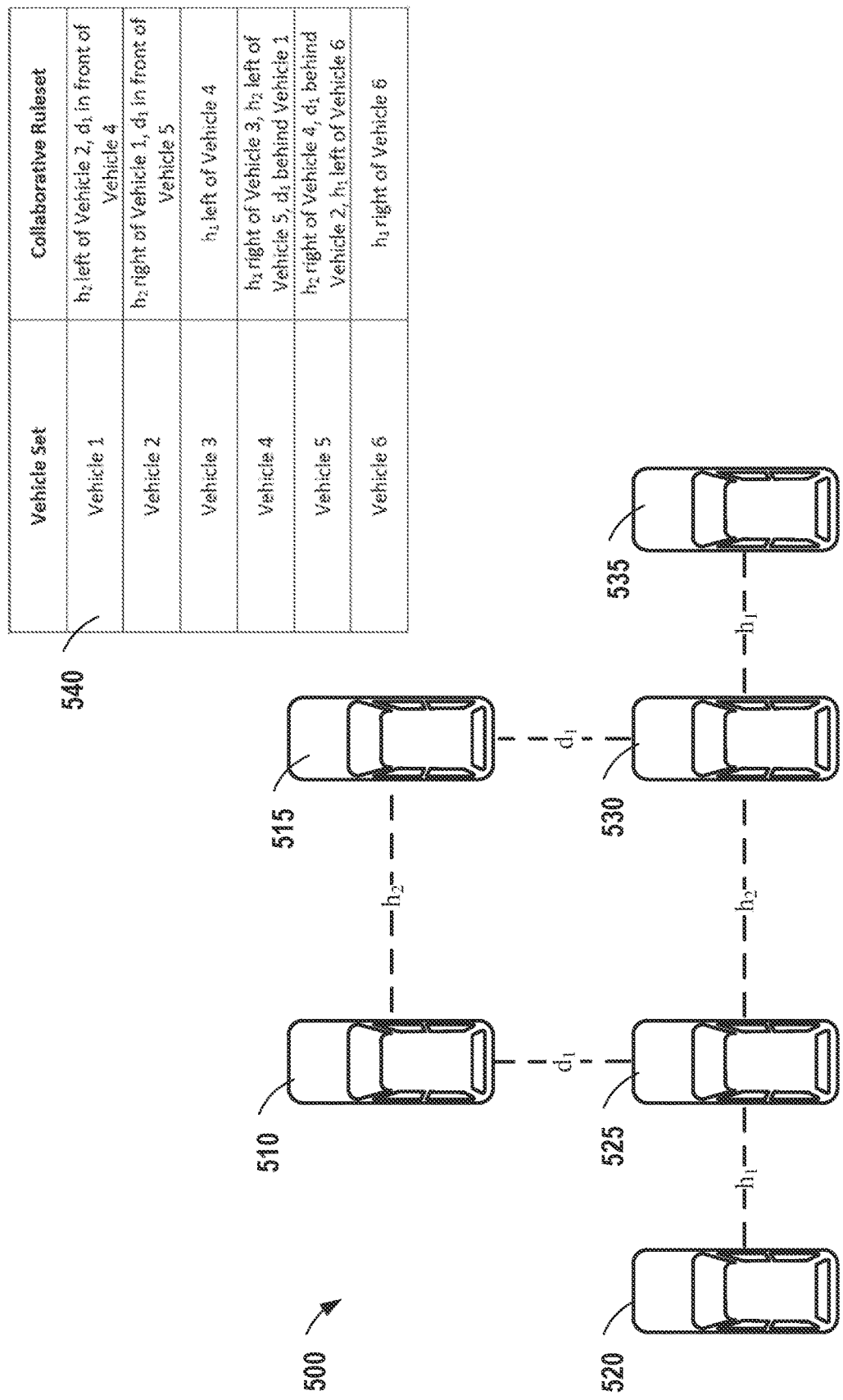
FIG. 5 is a diagram illustrating an example collaborative ruleset applied to a vehicle set, in accordance with embodiments of the present disclosure.

Method 400 initiates at operation 405, where a collaborative ruleset for a set of vehicles is received. The collaborative ruleset can be the same as, or substantially similar to, the collaborative rulesets described with respect to FIGS. 2 and 3. The collaborative ruleset can dictate positional requirements of vehicles within a vehicle set with respect to each other and/or the environment. FIG. 5 depicts an example collaborative ruleset 540 for a vehicle set.

A determination is made whether the collaborative ruleset is required to be updated. This is illustrated at operation 410. Determining whether the collaborative ruleset requires updating can be completed in the same, or a substantially similar manner, as described with respect to the collaborative ruleset updater 315 of FIG. 3. For example, the collaborative ruleset can be updated based on current contextual conditions (e.g., weather conditions, hazards, and/or locations) or manually by a user.

If a determination is made that the collaborative ruleset requires updating ("Yes" at operation 410), then the collaborative ruleset is updated at operation 415. Updating the collaborative ruleset can be completed in the same, or a substantially similar manner, as described with respect to the collaborative ruleset updater 315 of FIG. 3. For example, positional requirements such as horizontal spacing, vertical spacing, and/or vehicular arrangement can be updated based on pre-defined rules which indicate positional updates based on observed conditions. In embodiments, operation 410 can occur continuously, intermittently, periodically, or over any other suitable time period throughout the course of vehicle operation while following the collaborative ruleset obtained at operation 405. That is, operations 410-415 do not necessarily have to occur directly after operation 405, and can occur throughout method 400.

If a determination is made that the collaborative ruleset does not require updating ("No" at operation 410), or after updating the collaborative ruleset, sensor data is received indicating current positions of each vehicle within the vehicle set. This is illustrated at operation 420. Receiving sensor data to monitor the current positions of each vehicle can be completed in the same, or a substantially similar manner, as described with respect to the compliance monitoring module 320 described with respect to FIG. 3. For example, integrated vehicle sensors and/or surrounding IoT sensors can collect sensor data which can indicate whether or not the collaborative ruleset is being followed.

A determination is made whether a vehicle is non-compliant with the collaborative ruleset. This is illustrated at operation 425. Determining whether a vehicle is non-compliant with the collaborative ruleset can be completed in the same, or a substantially similar manner, as described with respect to the compliance monitoring module 320 of FIG. 3. For example, if sensor data indicates that a vehicle does not satisfy a positional requirement set forth in the collaborative ruleset, then a determination can be made that the vehicle is non-compliant.

If a determination is made that all vehicles are compliant with the collaborative ruleset ("No" at operation 425), then sensor data indicating current positions of each vehicle can continue to be received such that compliance with the collaborative ruleset can continue to be monitored.

If a determination is made that a vehicle is non-compliant with the collaborative ruleset ("Yes" at operation 425), then guidance data can be generated for complying with the collaborative ruleset. This is illustrated at operation 430. Generating guidance data for complying with the collaborative ruleset can be completed in the same, or a substantially similar manner, as described with respect to the guidance data generator 325 of FIG. 3. For example, augmented reality (AR) based guidance can be provided to one or more users through an AR device. In embodiments where manual control of vehicles is required, the guidance data can aid the user in complying with the collaborative ruleset. For example, the guidance data can indicate navigation actions (e.g., lane changes, speed up, brake, etc.) required for following the collaborative ruleset on an AR device.

In embodiments where autonomous or semi-autonomous vehicles are instructed to follow the collaborative ruleset, operation 425 may not be completed (e.g., assuming the autonomous or semi-autonomous vehicle accurately follows the collaborative ruleset), and method 400 can proceed directly from operation 420 to operation 430. In these embodiments, the guidance data can indicate future actions/predicted paths the autonomous or semi-autonomous vehicles will take to follow the collaborative ruleset.

The aforementioned operations can be completed in any order and are not limited to those described. Additionally, some, all, or none of the aforementioned operations can be completed, while still remaining within the spirit and scope of the present disclosure. For example, as discussed above, operation 410 can occur at any point in time and/or over any suitable time interval during method 400. Further, operation 425 may not be required in examples where autonomous or semi-autonomous vehicles are instructed to follow the collaborative ruleset.

Referring now to FIG. 5, shown is an example collaborative ruleset 540 which applies to a set of vehicles 500, in accordance with embodiments of the present disclosure. The vehicle set 500 includes a first vehicle 510, a second vehicle 515, a third vehicle 520, a fourth vehicle 525, a fifth vehicle 530, and a sixth vehicle 535. In embodiments, the vehicles within vehicle set 500 can be the same as, or substantially similar to, vehicles 330 and 340 of FIG. 3.

The collaborative ruleset 540 indicates that the first vehicle 510 should be positioned in the front left, with $h_2$ spacing to the left of the second vehicle 515 (e.g., a horizontal spacing requirement) and $d_1$ spacing in front of the fourth vehicle 525 (e.g., a vertical spacing requirement). The collaborative ruleset 540 indicates that the second vehicle 515 should be position in the front right, with $h_2$ spacing to the right of the first vehicle 510 and $d_1$ spacing in front of the fifth vehicle 530. The collaborative ruleset 540 indicates that the third vehicle 520 should be position in the back left, with $h_1$ spacing to the left of the fourth vehicle 525. The collaborative ruleset 540 indicates that the fourth vehicle 525 should be positioned in the center back left, with $h_1$ spacing to the right of the third vehicle 520, $h_2$ spacing to the left of the fifth vehicle 530, and $d_1$ spacing behind the first vehicle 510. The collaborative ruleset 540 indicates that the fifth vehicle 530 should be positioned in the center back right, with $h_2$ spacing to the right of the fourth vehicle 525, $h_1$ spacing to the left of the sixth vehicle 535, and $d_1$ spacing behind the second vehicle 515. The collaborative ruleset 540 indicates that the sixth vehicle should be positioned back right, with $h_1$ spacing to the right of the fifth vehicle 530.

The collaborative ruleset 540 depicted in FIG. 5 is merely exemplary, and any other suitable spacing requirements and/or vehicular arrangement requirements can be implemented without departing from the spirit and scope of the present disclosure. In embodiments, the collaborative ruleset 540 can obtained/defined in the same, or substantially similar manners, as described with respect to FIGS. 2-4. In embodiments, the collaborative ruleset 540 can be updated over time based on current contextual conditions or as specified manually by a user. In embodiments, vehicles within the vehicle set 500 can include manual and/or autonomous vehicles. In embodiments, guidance data (e.g., AR content) can be generated for users of the vehicles within vehicle set 500 to guide/inform users of projected paths/actions required to follow the collaborative ruleset 540.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

Several examples will now be provided to further clarify various aspects of the present disclosure:

Example 1: A method comprising receiving a collaborative ruleset for a set of vehicles, the collaborative ruleset defining relative positions each vehicle is required to maintain with respect to other vehicles within the set of vehicles, receiving sensor data indicating current positions of each vehicle within the set of vehicles while the vehicles are operating, and issuing a command to display, on an augmented reality (AR) device of a user of a first vehicle within the set of vehicles, AR content for complying with the collaborative ruleset.

Example 2: The limitations of Example 1, wherein the collaborative ruleset is updated based on a determined contextual condition.

Example 3: The limitations of any of Examples 1-2, wherein the collaborative ruleset is updated to increase spacing requirements between vehicles of the set of vehicles.

Example 4: The limitations of any of Examples 1-3, wherein the command is issued in response to the first vehicle not satisfying at least one rule within the collaborative ruleset.

Example 5: The limitations of any of Examples 1-4, further comprising issuing a second command to display, on a second AR device of a second user of a second vehicle within the set of vehicles, AR content for complying with the collaborative ruleset.

Example 6: The limitations of any of Examples 1-5, wherein the sensor data is received from integrated sensors within each vehicle of the set of vehicles.

Example 7: The limitations of any of Examples 1-6, wherein the AR content for complying with the collaborative ruleset includes visual guidance displayed on the AR device over the user's field of view which guides the first user to take actions within the first vehicle to comply with the collaborative ruleset.

Example 8: The limitations of any of Examples 1-6, wherein the first vehicle is an autonomous or semi-autonomous vehicle, wherein the AR content includes a projected path the first vehicle will take to follow the collaborative ruleset.

Example 9: A system comprising one or more processor and one or more computer-readable storage media collectively storing program instructions which, when executed by the processor, are configured to cause the processor to perform a method according to any of Examples 1-8.

Example 10: A computer program product comprising one or more computer readable storage media, and program instructions collectively stored on the one or more computer readable storage media, the program instructions comprising instructions configured to cause one or more processors to perform a method according to any one of Examples 1-8.

What is claimed is:

1. A method comprising:
receiving a collaborative ruleset for a set of vehicles, the collaborative ruleset defining relative positions each vehicle is required to maintain with respect to other vehicles within the set of vehicles;
receiving sensor data indicating current positions of each vehicle within the set of vehicles while the set of vehicles are operating;
analyzing the sensor data with respect to the collaborative ruleset to determine whether respective ones of the vehicles within the set of vehicles are complying with the collaborative ruleset while the set of vehicles are operating; and
issuing a command to display, on an augmented reality (AR) device of a user of a first vehicle within the set of vehicles and responsive to the first vehicle not complying with the collaborative ruleset, AR content for complying with the collaborative ruleset.

2. The method of claim 1, wherein the collaborative ruleset is updated based on a determined contextual condition.

3. The method of claim 2, wherein the collaborative ruleset is updated to increase spacing requirements between vehicles of the set of vehicles.

4. The method of claim 1, wherein the AR content for complying with the collaborative ruleset includes visual guidance displayed on the AR device over the user's field of view which guides the first user to take actions within the first vehicle to comply with the collaborative ruleset.

5. The method of claim 1, wherein the first vehicle is an autonomous or semi-autonomous vehicle, wherein the AR content includes a projected path the first vehicle will take to follow the collaborative ruleset.

6. A system comprising:
one or more processors; and
one or more computer-readable storage media collectively storing program instructions which, when executed by the one or more processors, are configured to cause the one or more processors to perform a method comprising:
receiving a collaborative ruleset for a set of vehicles, the collaborative ruleset defining relative positions each vehicle is required to maintain with respect to other vehicles within the set of vehicles;
receiving sensor data indicating current positions of each vehicle within the set of vehicles while the set of vehicles are operating;
analyzing the sensor data with respect to the collaborative ruleset to determine whether respective ones of the vehicles within the set of vehicles are complying with the collaborative ruleset while the set of vehicles are operating; and
issuing a command to display, on an augmented reality (AR) device of a user of a first vehicle within the set of vehicles and responsive to the first vehicle not complying with the collaborative ruleset, AR content for complying with the collaborative ruleset.

7. The system of claim 6, wherein the collaborative ruleset is updated based on a determined contextual condition.

8. The system of claim 7, wherein the collaborative ruleset is updated to increase spacing requirements between vehicles of the set of vehicles.

9. The system of claim 6, wherein the AR content for complying with the collaborative ruleset includes visual guidance displayed on the AR device over the user's field of view which guides the first user to take actions within the first vehicle to comply with the collaborative ruleset.

10. The system of claim 6, wherein the first vehicle is an autonomous or semi-autonomous vehicle, wherein the AR content includes a projected path the first vehicle will take to follow the collaborative ruleset.

11. A computer program product comprising one or more computer readable storage media, and program instructions collectively stored on the one or more computer readable storage media, the program instructions comprising instructions configured to cause one or more processors to perform a method comprising:
receiving a collaborative ruleset for a set of vehicles, the collaborative ruleset defining relative positions each vehicle is required to maintain with respect to other vehicles within the set of vehicles;
receiving sensor data indicating current positions of each vehicle within the set of vehicles while the set of vehicles are operating;
analyzing the sensor data with respect to the collaborative ruleset to determine whether respective ones of the vehicles within the set of vehicles are complying with the collaborative ruleset while the set of vehicles are operating; and
issuing a command to display, on an augmented reality (AR) device of a user of a first vehicle within the set of vehicles and responsive to the first vehicle not complying with the collaborative ruleset, AR content for complying with the collaborative ruleset.

12. The computer program product of claim 11, wherein the collaborative ruleset is updated based on a determined contextual condition, wherein the collaborative ruleset is updated to decrease spacing requirements between vehicles of the set of vehicles.

13. The computer program product of claim 11, wherein the AR content for complying with the collaborative ruleset includes visual guidance displayed on the AR device over the user's field of view which guides the first user to take actions within the first vehicle to comply with the collaborative ruleset.

14. The computer program product of claim 11, wherein the first vehicle is an autonomous or semi-autonomous vehicle, wherein the AR content includes a projected path the first vehicle will take to follow the collaborative ruleset.

15. The method of claim 1, wherein the first vehicle is an autonomous vehicle, wherein the method further comprises:
issuing, to one or more processing circuits of the first vehicle, a command to reposition the first vehicle while the first vehicle is operating such that the first vehicle complies with the collaborative ruleset, wherein the AR content includes a projected path the first vehicle will take to comply with the collaborative ruleset.

16. The method of claim 1, wherein the collaborative ruleset is updated using a machine learning (ML) model trained on historical collaborative ruleset update data.

17. The method of claim 16, wherein the historical collaborative ruleset update data used to train the ML model includes vehicle characteristics associated with vehicles affected by historical collaborative ruleset updates and contextual conditions associated with historical collaborative ruleset updates.

18. The method of claim 1, wherein the collaborative ruleset for the set of vehicles is defined using a machine learning (ML) model, wherein the ML model receives a number of vehicles in the set of vehicles, one or more types of vehicles within the set of vehicles, and a navigation route as input data and wherein the ML model outputs the collaborative ruleset for the set of vehicles based on the input data.

* * * * *